United States Patent
Bradshaw et al.

(10) Patent No.: US 10,810,097 B2
(45) Date of Patent: Oct. 20, 2020

(54) CLIENT-ASSISTED PHASE-BASED MEDIA SCRUBBING

(71) Applicant: Micron Technology, Inc., Boise, ID (US)

(72) Inventors: Samuel E. Bradshaw, Sacramento, CA (US); Justin Eno, El Dorado Hills, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 167 days.

(21) Appl. No.: 16/183,628

(22) Filed: Nov. 7, 2018

(65) Prior Publication Data

US 2020/0142792 A1     May 7, 2020

(51) Int. Cl.
    *G06F 11/00*     (2006.01)
    *G06F 11/20*     (2006.01)
    *G06F 3/06*     (2006.01)

(52) U.S. Cl.
    CPC ........ *G06F 11/2094* (2013.01); *G06F 3/0619* (2013.01); *G06F 3/0647* (2013.01); *G06F 3/0673* (2013.01); *G06F 2201/805* (2013.01); *G06F 2201/82* (2013.01)

(58) Field of Classification Search
    CPC ............. G06F 11/0727; G06F 11/0763; G06F 11/1658; G06F 11/106; G06F 11/1056
    See application file for complete search history.

(56) References Cited

U.S. PATENT DOCUMENTS

2015/0127972 A1*    5/2015    Chun .................. G06F 11/1008
    714/6.13

OTHER PUBLICATIONS

Samuel E. Bradshaw, et al., Performing Data Restore Operations in Memory, U.S. Appl. No. 15/670,544, filed Aug. 7, 2017, 45 pages.

* cited by examiner

*Primary Examiner* — Christopher S McCarthy
(74) *Attorney, Agent, or Firm* — Nicholson De Vos Webster & Elliott LLP

(57) ABSTRACT

A technique of receiving a write transaction directed to a group of memory parcels of a memory device from a client source. The technique determines a state of a first indicator used to indicate which one of two data structures contains a newer mapping of the group of memory parcels, while the other data structure contains an older mapping of the group of memory parcels. The technique determines a state of a second indicator used to indicate which one of the two data structures is in current use for the group of memory parcels and compares the states of the two indicators. When a data structure in current use does not contain the newer mapping, the technique changes the state of the second indicator to the state of the first indicator. The technique writes content of the write transaction to storage locations based on the newer mapping.

20 Claims, 9 Drawing Sheets

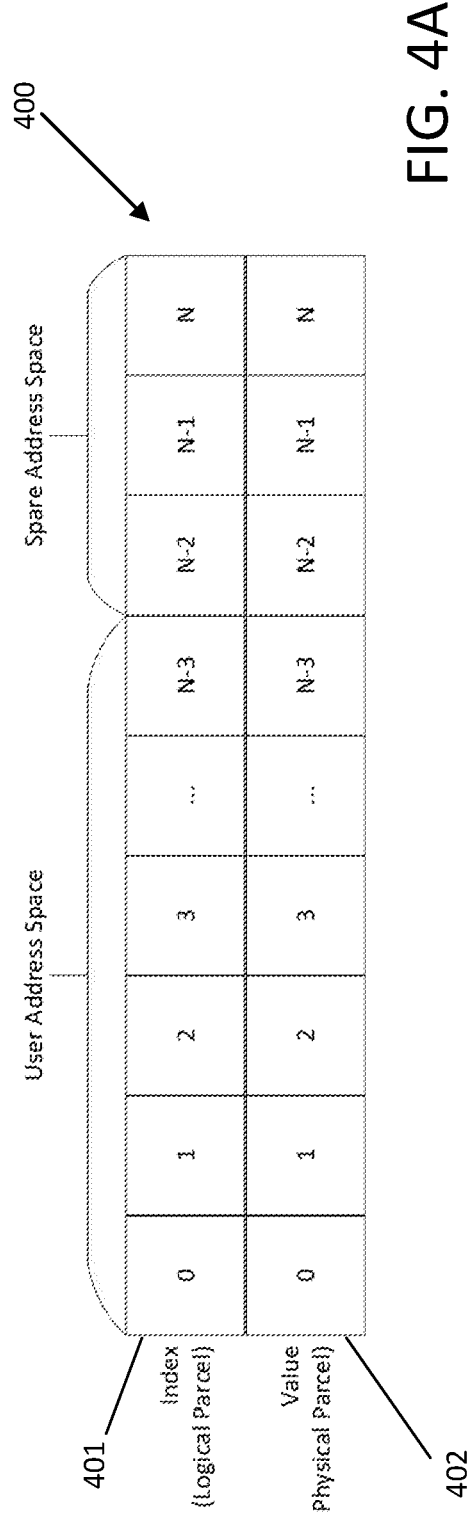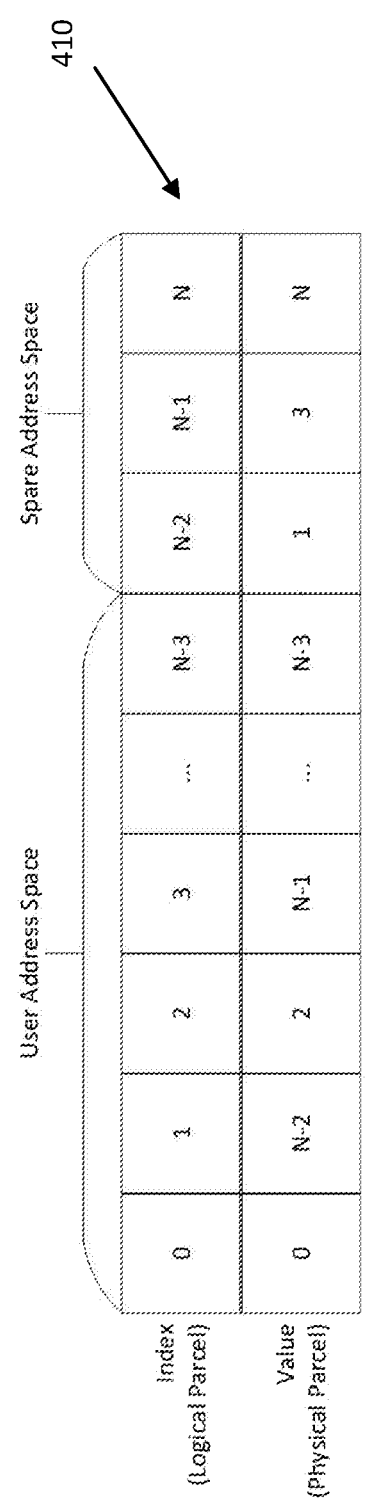
FIG. 4A
FIG. 4B

CLIENT-ASSISTED PHASE-BASED MEDIA SCRUBBING

TECHNICAL FIELD

The present disclosure generally relates to error mitigation, and more specifically, to client-assisted phase-based media scrubbing.

BACKGROUND ART

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 4A & 4B illustrate example repair tables used for remapping of error-prone memory parcels in accordance with some embodiments of the present disclosure.

DETAILED DESCRIPTION

Figure 1:
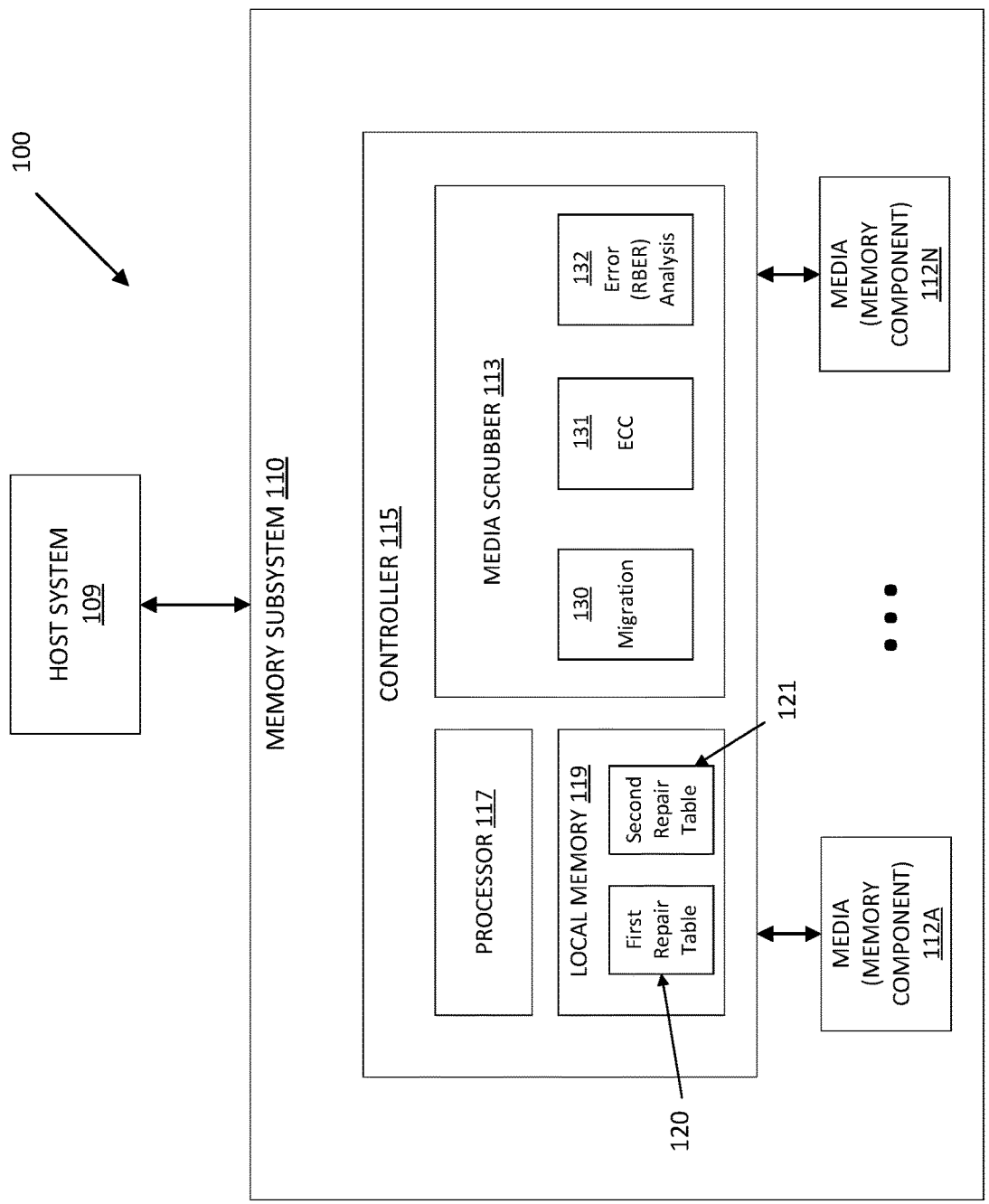
FIG. 1 illustrates an example computing environment that includes a memory subsystem in accordance with some embodiments of the present disclosure.

Aspects of the present disclosure pertain to client-assisted phase-based media scrubbing in a memory subsystem. A memory subsystem is synonymous with a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory subsystem is a hybrid memory/storage subsystem. In general, a host system can utilize a memory subsystem that includes one or more memory components. The host system can provide data for storage (e.g., write data) in the memory subsystem and can request data for retrieval (e.g., read data) from the memory subsystem.

For many media, including phase change media, the memory subsystem can experience faults both intrinsic and extrinsic in nature, and these faults may manifest as bit errors in the data stored on the media. Error detection and correction schemes, such as Error-Correcting Code (ECC) and Redundant Array of Independent Disks (RAID), layered upon the media attempt to eliminate such errors and faithfully reconstruct previously stored data. Some media, such as phase change media, can exhibit widely varying error rates, which could overwhelm the storage system's finite correction mechanisms (e.g., ECC and/or RAID).

Furthermore, storage cells of some non-volatile media, such as phase change media, experience drift of the threshold voltage, used to distinguish the bit state(s) stored in a storage cell. With sufficient drift of the threshold voltage over time, a read of a storage cell can result in an incorrect storage cell state(s) output. Also, with phase change media, leaving a storage cell in a certain fixed state for a prolonged period can result in that cell locking itself into that state, making the cell unprogrammable to new data.

Traditional techniques to address error correction of data stored in memory, such as the use of ECC and RAID, can be inadequate to address error clusters. With NAND-type media, these schemes combine with defect remapping translation layers to isolate and discard defective regions. Phase change media can utilize similar techniques, however, the dimensions against which these remapping schemes deploy differ from that of NAND, because the structure of phase change memory arrays and the presence of errors differ. Furthermore, phase change memory can experience a multitude of characteristics that require unique handling. In particular, phase change memory cells experience a rapid threshold voltage drift and eventual transition to an unselectable state. Without proper management, the useful life of a phase change media cell is much reduced from its ideal capability.

Aspects of the present disclosure address the above and other deficiencies by providing a managed scrubber operation that programs or reprograms storage locations at periodic intervals to refresh storage locations by migrating contents of memory parcels from storage locations mapped in a first repair table to storage locations mapped in a second repair table. Instead of just reprogramming the storage locations, the scrubber also operates to replace storage locations that become error prone. As used herein, "memory parcel" refers to a portion of memory allocated for storing content (e.g., data). The second repair table has a mapping based upon updated (newer) error analysis of the memory parcels of the memory device. By periodically transferring data between memory locations, the scrubber ensures that data does not become stale over time, which could result in the deficiencies described above. By transferring data content to memory parcels mapped to lower error rate locations, the migration process ensures storage of data content in less error-prone memory locations. Furthermore, embodiments use client accesses of memory (e.g., read and/or write transactions) to assist or supplement the scrubber in the migration operation.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, memory components 112A to 112N are non-volatile phase change media. In some embodiments, the memory subsystem 110 is a storage system. An example of a storage system is an SSD. In some embodiments, the memory subsystem 110 is a hybrid memory/storage subsystem. In general, the computing environment 100 can include a host system 109 that uses the memory subsystem 110. For example, the host system 109 can transact to write data to the memory subsystem 110 and read data from the memory subsystem 110. In some embodiments, an alternate reference for the host system 109 is a "client system" or just a "client."

The host system 109 can be a computing device such as a desktop computer, laptop computer, network server, mobile device, or such computing device that includes a memory and a processing device. The host system 109 can couple to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can transmit data between the host system 109 and the memory subsystem 110. The host system 109 can further utilize a Non-Volatile Memory Express (NVMe) interface to access the memory components 112A to 112N, when coupled with the PCIe interface. The physical host interface can provide an interface for passing control, address, data, and other signals between the memory subsystem 110 and the host system 109.

The memory components 112A to 112N can include any combination of different types of non-volatile memory components and/or volatile memory components. An example of non-volatile memory components includes a Negative-And (NAND) type flash memory. Each of the memory components 112A to 112N can include one or more arrays of memory cells such as single level cells (SLCs), multi-level cells (MLCs), triple level cells (TLCs), or quad-level cells (QLCs)). In some embodiments, a memory component can include both an SLC portion and an MLC portion of memory cells. Each of the memory cells can store one or more bits of data used by the host system 109. Although memory components 112A to 112N are non-volatile memory components, such as NAND type flash memory or phase change memory, the memory components 112A to 112N can be other types of volatile or non-volatile memory.

In some embodiments, the memory components 112A to 112N can be, but are not limited to, random access memory (RAM), read-only memory (ROM), dynamic random-access memory (DRAM), synchronous dynamic random-access memory (SDRAM), phase change memory (PCM), magneto random-access memory (MRAM), Negative-Or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell programs without the non-volatile memory cell being previously erased. Furthermore, the memory cells of the memory components 112A to 112N can group as memory pages, data blocks, or memory parcels, that refer to a unit of the memory component used to store data.

The memory system controller 115 (hereinafter referred to as "controller") can communicate with the memory components 112A to 112N to perform operations such as reading data, writing data, erasing data at the memory components 112A to 112N, and other such operations. The controller 115 can include hardware, such as one or more integrated circuits, discrete components, a buffer memory, or a combination thereof. The controller 115 can be a microcontroller, special purpose logic circuitry (e.g., a field programmable gate array (FPGA), an application specific integrated circuit (ASIC), or another suitable processor. The controller 115 can include a processor 117 configured to execute instructions stored in local memory 119.

In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 109. In some embodiments, the local memory 119 can include memory registers storing memory pointers, fetched data, etc. The local memory 119 can also include read-only memory (ROM) for storing micro-code. The local memory 119 can also include random-access memory (RAM) for storing various data structures, other constructs, and provide a buffer function for buffering data. As described below, the local memory 119 can also store data structures, such as repair tables 120 and 121, various bit indicators, pointers, etc., for use with a media scrubber component 113. While the example memory subsystem 110 in FIG. 1 includes the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 109 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can be responsible for the operation of the media scrubber component 113. The controller 115 can further include host interface circuitry to communicate with the host system 109 via the physical host interface. The host interface circuitry can convert the commands received from the host system into command instructions to access the memory components 112A to 112N as well as convert responses associated with the memory components 112A to 112N into information for the host system 109.

The memory subsystem 110 can also include additional circuitry or components not illustrated. In some embodiments, the memory subsystem 110 can include a cache, buffer, and/or address circuitry (e.g., a row decoder and a column decoder) that can receive an address from the controller 115 and decode the address to access the memory components 112A to 112N.

The memory subsystem 110 includes the media scrubber component 113 that can perform the operations described below in this disclosure. In some embodiments, the controller 115 includes at least a portion of the media scrubber component 113. For example, the controller 115 can include a processor 117 configured to execute instructions stored in local memory 119 and/or the media scrubber component 113 for performing the operations described herein. In some embodiments, the media scrubber component 113 is part of the host system 109, an application, or an operating system. The term "processing device" used herein applies to the controller 115, where the processor 117 provides some or all the processing functions.

The media scrubber component 113 (hereinafter, "media scrubber" or "scrubber") can include a migration component 130 to perform the client-assisted media scrubbing function described herein. The migration component 130 operates in the background to provide a managed scrubber operation that migrates contents of memory parcels from storage locations based on a mapping of the memory parcels provided by a first repair table 120 to storage locations based on a mapping of memory parcels provided by a second repair table 121. The migration component 130 can utilize client transactions (e.g., read and/or write operations) of the host system 109 to access the memory components 112A to 112N, to assist or supplement the scrubber migration operation of the data. The scrubber 113 can be a software routine, hardware, firmware, or a combination thereof, to perform the various functions described herein.

The scrubber 113 can also include an ECC component 131 to provide error detection and correction function to read data from a memory storage location to provide the correct data. The scrubber 113 can also include an error analysis and repair table generation component 132 to perform the error analysis on the memory parcels described herein and to assist in the generation of the repair tables, such as repair tables 120 and 121. The error analysis component 132 can perform a variety of error analysis to generate the repair tables and, in some embodiments, the error analysis component 132 uses Raw Bit Error Rate (RBER) of the data read from memory to perform the error analysis. Descriptions below describe further details regarding the operations of the scrubber 113.

Figure 2:
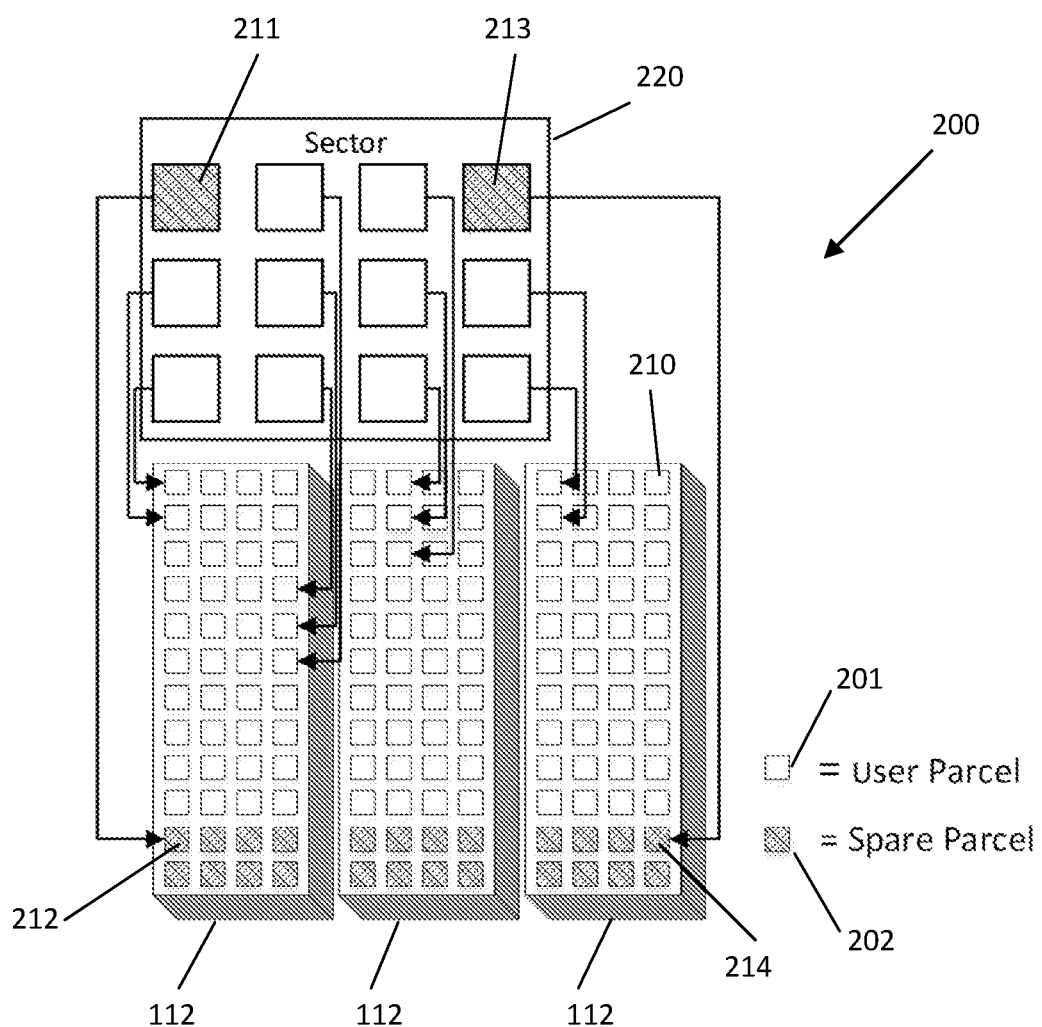
FIG. 2 illustrates an example portion of an array of memory having user parcels and spare parcels organized into sectors in accordance with some embodiments of the present disclosure.

FIG. 2 illustrates an example portion of a memory array 200 having user parcels 201 and spare parcels 202 organized into sectors in accordance with some embodiments of the present disclosure. The term "parcel" used herein refers to a portion of the memory components 112A to 112N, having a selected granularity for storing content. As shown, the example memory array 200 has three memory components 112, where each memory component 112 has a multiple number of memory parcels 210. The granularity of the parcel 210 can be of any size. The parcel 210 can be one or more storage cells, blocks, pages, slice(s), partition(s), dice, or another portion of memory. Thus, the parcel 210 is any granularity defining a portion of memory components 112A to 112N.

Furthermore, the memory array 200 may have any number of memory components 112, utilizing a variety of memory technology. In some embodiments, phase change memory (PCM) technology that changes the bulk resistance of the material constructs an array of non-volatile storage elements of memory array 200. In some embodiments, such PCM memory uses an array that is three-dimensional (3D).

In some embodiments, a group of memory parcels forms a sector. Array 200 illustrates an example of a sector 220, formed from a group of twelve memory parcels 210. A sector, such as sector 220, can have parcels all from one memory component 112 or from different memory components 112. The grouping need not be of consecutive memory parcels 210. The memory components 112A to 112N have multiple sectors 220. Thus, a sector is a logical construction composed of physical media in the form of one or more parcels and the memory components 112 have a number of such sectors. In some embodiments, a sector correlates to a segment of memory accessed by the host system 109 to conduct a transaction. For example, a read access transaction of the host system 109 reads a sector of stored content from memory component(s) 112. Likewise, a write access transaction of the host system 109 writes a sector of content to memory component(s) 112.

The memory parcels 210 of array 200 include user memory parcels 201 and spare memory parcels 202. User parcels 201 are accessible for allocation of storage locations to a user, such as the host system (e.g., a client) 109. Spare parcels 202 are not accessible for allocation of storage locations to a user until remapped. When remapped, spare parcels 202 provide replacement storage locations, e.g., when substituted for error-prone user parcels 201. FIG. 2 illustrates an example remapping, in which error-prone user memory parcel 211 of sector 220 remaps to spare memory parcel 212 and error-prone user memory parcel 213 remaps to spare memory parcel 214, so that memory parcels 211 and 213 access physical locations of memory parcels 212 and 214, respectively. In some embodiments, sector 220 contains only user memory parcels 201 and spare memory parcels reside outside of the sector 220. In some embodiments, the sector 220 can contain a number of spare parcels 202, each potentially providing spare storage (e.g., for an error-prone user parcel 201). Therefore, depending on the embodiment, sectors can contain only user parcels 201 and spare parcels 202 reside in a spare address space separate from the sectors, or sectors can contain both user and spare memory parcels. The parcel remapping (or redirection) procedure described later in the description provides a mechanism for the substitution of spare parcels for the user parcels so that the processing device can copy content of user parcels 201 to spare parcels 202 without overwriting any other user data. Furthermore, in some embodiments, implementation variations restrict which spare parcel 202 can provide the substitution for user parcels 201 of a sector or sectors. For example, one or more sectors, such as the sector 220, can provide such a substitution domain, wherein spare parcels 202 configured within the sector 220, or allocated to sector 220, provide the substitution exchange for poor performing (e.g., error-prone) user parcels 201 within the sector 220.

Figure 3:
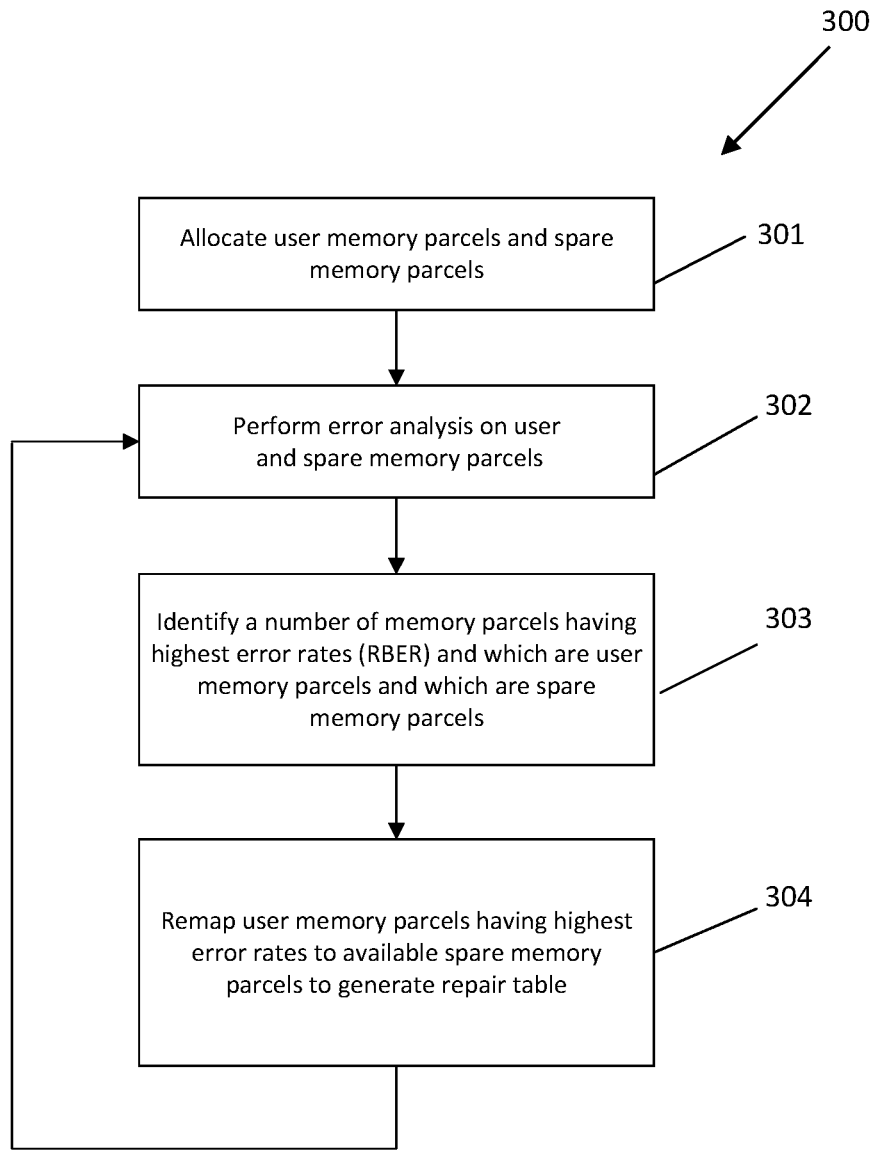
FIG. 3 illustrates a flow diagram of an example method to perform remapping of memory parcels having highest error rates to spare parcels in accordance with some embodiments of the present disclosure.

FIG. 3 illustrates a flow diagram of an example method 300 to perform remapping (redirecting) of memory parcels having highest error rates to spare parcels in accordance with some embodiments of the present disclosure. For example, the error analysis component 132 of scrubber 113 performs the RBER analysis of the memory parcels 210. The processing device ranks the RBER results and, where appropriate, substitutes spare memory parcels having lower RBER for user parcels having higher RBER. In some embodiments with substitution restriction limited to within a sector, spare parcels 202 assigned to the sector, whether configured within the sector or configured outside of the sector but allocated to the sector, can only provide the substitution for user parcels 201 for that sector.

The processing logic performing the remapping of the memory parcels can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a processing device, such as the controller 115, allocates parcels 210 of one or more memory component(s) 112 as user parcels 201 and spare parcels 202, as an initial mapping procedure. In some embodiments, this allocation has both user parcels 201 and spare parcels 202 grouped into different sectors 220. In some embodiments, only user parcels 201 are grouped into sectors and the spare parcels 202 reside outside of the sectors. In some embodiments, the processing device can combine the allocation process of block 301 with the processes of blocks 302-304 to initially allocate the highest RBER memory parcels as the spare memory parcels.

At block 302, the processing device, performs error analysis on user parcels and spare parcels. In one embodiment, a suite of functionality of the scrubber component 113 provides a software routine to perform defect (e.g., error) analysis and provides results to the processing device. In one embodiment, the scrubber component 113 includes the error analysis component 132 to perform this function. At a high level, the scrubber component 113 is a background process that reads parcels 210, tracks the number of errors per parcel 210 (e.g., using ECC component 131), and ranks the memory parcels (e.g., from highest-to-lowest RBER values).

At block 303, the processing device uses the RBER findings to identify a selected number of parcels 210 that have the highest RBER. In other techniques, the processing device identifies those RBER results exceeding a threshold value. In some embodiments, the selected number of highest RBER parcels depends on spare parcels available for substitution for that sector. The processing device further determines which of the highest RBER parcels are user parcels 201 and which are spare parcels 202.

Once RBER values are known and the processing device ranks the parcels based on the RBER values, the processing device identifies the worst performing (e.g., highest RBER) user parcels 201 as candidates for remapping to the spare parcel space. Although the processing device may select any number of candidates for the number of worst performing user parcels 201, generally those selected candidates should have the ability to remap to spare parcels 202 available to that same sector. Hence, in some embodiments, the number of spare parcels 202 available for a sector predetermines the number of candidate user parcels 201 identified as having the highest RBER. Alternatively, the processing device can select candidates for remapping based on user parcels 201 having RBER above a threshold level, up to the number of available spare parcels 202 for that sector. For simplicity of description, the embodiments herein refer to the highest error rates or highest RBER, yet the error rates can be applicable to exceeding a threshold level, as well as the use of other criteria. Also, note that for spare memory parcels 202 ranked in the highest error rate category, these spare parcels 202 are not substitute targets for remapping the candidate user parcels 201.

At block 304, once the processing device identifies the user parcels 201 having the highest RBER, the processing device remaps these user parcels 201 to available spare parcels 202. This remapping is a logical-to-physical address translation only and does not yet transfer the data from the original, highest RBER user parcel 201 to a spare parcel 202. The processing device stores this revised mapping as a repair table, such as repair table 120 or 121. As described above, for sector-based domains, the user parcels 201 of the sector having the highest RBER remap to spare parcels 202 available to the sector (whether configured as part of the sector or configured external to the sector but allocated as available to the sector) that do not have the highest RBER. Thus, the remapping process exchanges a higher RBER user parcel 201 and a lower RBER spare parcel 202, so that the lower RBER spare parcel is now the remapped user parcel and the higher RBER user parcel is now the remapped spare parcel. The remapping process remaps a different physical storage location for a logical address accessing that memory parcel.

In some embodiments, the processing device maintains the remapping of parcels in a data structure. Where multiple sectors provide for the grouping of the memory parcels, the data structure can store the corresponding sector mappings of the memory parcels. Furthermore, because the scrubber classifies parcels as either error-prone or error-resistant, based on RBER rankings, the sector mappings operate as "repair tables" to "repair" or fix sectors into their best or better possible states by avoiding error-prone parcels in favor of error-resistant parcels. The term "repair table set" refers to the grouping together of individual sector repair tables in the repair tables 120-121.

As described further below, the processing device creates two different data structures (e.g., two different repair tables 120-121) to store two different mappings of the memory parcels. At initialization of the memory subsystem 110, prior to the host system 109 storing data in one or more of the memory components 112, the processing device initiates the method 300 to allocate user memory parcels 201 and spare memory parcels 202 (as shown at block 301). Once user and spare memory parcel allocation occurs, the processing device performs the error analysis of block 302 to identify the highest RBER memory parcels (e.g., at periodic intervals), including which are user memory parcels 201 and which are spare memory parcels 202 (as shown in block 303). The processing device remaps highest RBER user memory parcels to available spare memory parcels having lower RBER and creates an initial set of sector mappings of the logical-to-physical address translation of the memory parcels as the first repair table 120 (as shown in block 304).

As noted above, in some embodiments, the processing device can combine the allocation process of block 301 with the processes of blocks 302-304 to initially allocate the highest RBER memory parcels as the spare memory parcels. However performed, in some embodiments, the initially-generated repair table contains a mapping of user memory parcels and spare memory parcels where the highest RBER memory parcels reside as spare parcels. Furthermore, in some embodiments, this initial mapping of user and spare memory parcels provides the mapping to storage locations which constitute the identity mapped locations, as described below. Thus, the initially-created first repair table 120 contains a set of sector mappings of memory parcels, where the sector mappings place the highest RBER memory parcels in the spare space.

After this initialization process, the first repair table contains an initial set of sector mappings of memory parcels. The client (e.g., host system 109) can store data to, and read data from, memory component(s) 112 by utilizing the logical-to-physical translation provided by the first repair table 120 to access a physical storage location corresponding to an access address.

A period of time after the generation of the first repair table set, the processing device again performs actions noted in blocks 302-304. The period of time can be seconds, minutes, hours, days, weeks, based upon host operations, etc. Due to continual usage and life cycle of the memory components 112, the RBER values of various memory parcels change over time. Thus, as the first set of mappings of the user and spare parcels becomes stale over time, performing a newer RBER analysis of the user and spare memory parcels can identify a newer set of highest RBER parcels. Similarly, previously remapped highest RBER parcels may no longer fit within that category. Accordingly, running a newer error analysis can identify a new list of highest RBER user parcels for remapping to spare parcel locations. Performing the actions noted in blocks 302-304, the processing device generates a new mapping of user and spare memory parcels, recorded as a newer set of sector mappings in the second repair table 121. The processing device will use the mappings provided by the second repair table 121 to migrate data from physical locations mapped in the first repair table to physical locations mapped in the second repair table, in order to store the data in lower RBER storage locations. Performing the actions of blocks 302-304 at a later time again generates a subsequent newer repair table having more current RBER values.

Once the processing device creates the second repair table set for the sectors, the scrubber 113 can migrate data content for a sector based on the parcel mapping in the first repair table 120 to the newer mapping based on parcel mapping in the second repair table 121. In some instances, a parcel's physical location is the same between the two mappings. In other instances, a parcel's physical location will be different (e.g., remapped to a spare parcel location). Because the memory subsystem 110 uses the repair tables 120 and 121 to locate the parcels for a given sector, the repair tables reside elsewhere other than in the memory component 112. In some embodiments, the local memory 119 stores the repair tables (e.g., 120 and 121). For example, the repair tables 120-121 may reside in RAM within the local memory 119.

The mappings of the newer sector repair table set in the second repair table 121 can differ from the mapping of the sector repair table set in the first repair table 120. The first repair table 120 functions as the current repair table for accessing the memory parcels, until the scrubber 113 migrates the contents of those memory parcels to physical locations mapped by the second repair table 121, at which time the second repair table 121 becomes the current repair table for those memory parcels. Note that the scrubber 113 cannot simply update the in-use first repair table set, because the scrubber needs to consult the "older" mapping to read the current content first from the mapping of the first repair table 120, then consult the "newer" mapping of the second repair table 121 to write the content.

Once the processing device constructs the newer second repair table 121, this repair table commences to assume the new "current" role for parcels that had their contents migrated to storage locations mapped in the second repair table 121. Once data for all user memory parcels mapped in the first repair table 120 migrate to the physical locations mapped in the second repair table 121, repair table 120 becomes unused. Now the cycle repeats itself, with the processing device creating the next newer mapping (by performing blocks 302-304) as the unused first repair table 120. The content migration is now from the mapping of the second repair table 121 (now the "older" repair table) to the mapping of the first repair table 120 (which now becomes the "newer" repair table). Hence, the scrubber 113 alternates the "older" and "newer" repair table designations between the two repair tables, giving rise to the term "phase-based scrubbing."

FIGS. 4A & 4B illustrate example repair tables used for remapping of error-prone memory parcels 210 in accordance with some embodiments of the present disclosure. Each substitution domain (e.g., sector 220) in the system contains user parcels 201 and initially available spare parcels 202 (whether within the sector, or in a spare space made available to the sector for remapping). To facilitate redirecting user parcels' content into spare parcel location(s), the memory subsystem 110 uses a method for applying a logical-to-physical (L2P) mapping of parcels 210.

In some embodiments, the memory subsystem 110 maintains an array 400 as the repair table for each substitution domain (e.g., sector). An element in the array 400 represents a parcel and its index 401 represents its position in the sector. For example, the index in array 400 is equivalent or mapped to a logical address and the content 402 represents the physical address.

FIG. 4A represents an example array 400 for a sector in its initial state with all parcels 210 identity mapped. In some embodiments, repair table 400 represents a sector of memory parcels initially mapped in the first repair table 120. Identity mapping refers to the default/initially allocated state in which the logical parcel address/index matches the physical parcel address/value at initial allocation (e.g., allocation shown in block 301). In the example array 400, the processing device allocated parcels N−2 through N as spares available for a sector for having the highest RBER during an initial error analysis. Thus, parcels 1 through N−3 are in the user address space and parcels N−2 to N are in the spare address space. A logical address access maps to an index 401 of a corresponding parcel and the content (e.g., "value") then provides the physical address for accessing the content for that parcel.

FIG. 4B represents an example of the memory parcels of the same sector of FIG. 4A, but after the scrubber 113 has run at least once to generate the second repair table 121. In the example, the error analysis component 132 of scrubber 113 determined that parcels 1, 3, and N (as referenced by their physical addresses) have the highest RBER. To remove the error-prone parcels from the user address space, the processing device migrates content away from parcels 1 and 3 to spare parcels N−2 and N−1, respectively. The description below describes the migration of the content using a repair table in greater detail. Because parcel N is among the parcels having the highest RBER, parcel N remains in the spare address space. Thus, array 410 shows remapping of two user parcels, parcels 1 and 3, from the user address space to the spare address space. The physical parcels 1 and 3 are remapped to logical Parcels N−2 and N−1, respectively, when generating the mapping for the memory parcels of this sector in the second repair table 121. Thus, as an example, FIG. 4A shows the "older" or "earlier" mapping of a sector in the first repair table 120 and FIG. 4B shows the "newer" mapping of the same sector in the second repair table 121.

Once the newer repair table is available, the memory subsystem 110 can then provide for the migration of content corresponding to the memory parcels by accessing the two arrays 400 and 410. Using memory parcel 1 as an example for migration, the scrubber 113 looks at the mapping of array 400 in the first repair table 120 for memory parcel 1 to read the content from physical location 1. Then, the scrubber 113 looks at the mapping of array 410 in the second repair table 121 for memory parcel 1 to write the content to physical location N−2. In the case of memory parcel 2, the target destination is the same as the source destination, so that the scrubber need not perform data migration to a lower RBER parcel. However, with phase change media, where the media can experience higher threshold voltage drift and possible memory cell transition to a locked state over time, performing the migration by rewriting the data (e.g., programming the data) to the same physical location can alleviate these problems. Accordingly, in some embodiments, all parcels have their data migrated, whether the actual physical location changes or not changes between the two repair tables. Therefore, for memory parcel 2, the processing device reads data from physical location 2 and writes the data back to the same physical location 2. As noted previously, in some embodiments, the allocating process 301 of FIG. 3 places the highest-RBER parcels in the spare address space at initial allocation.

Figure 5:
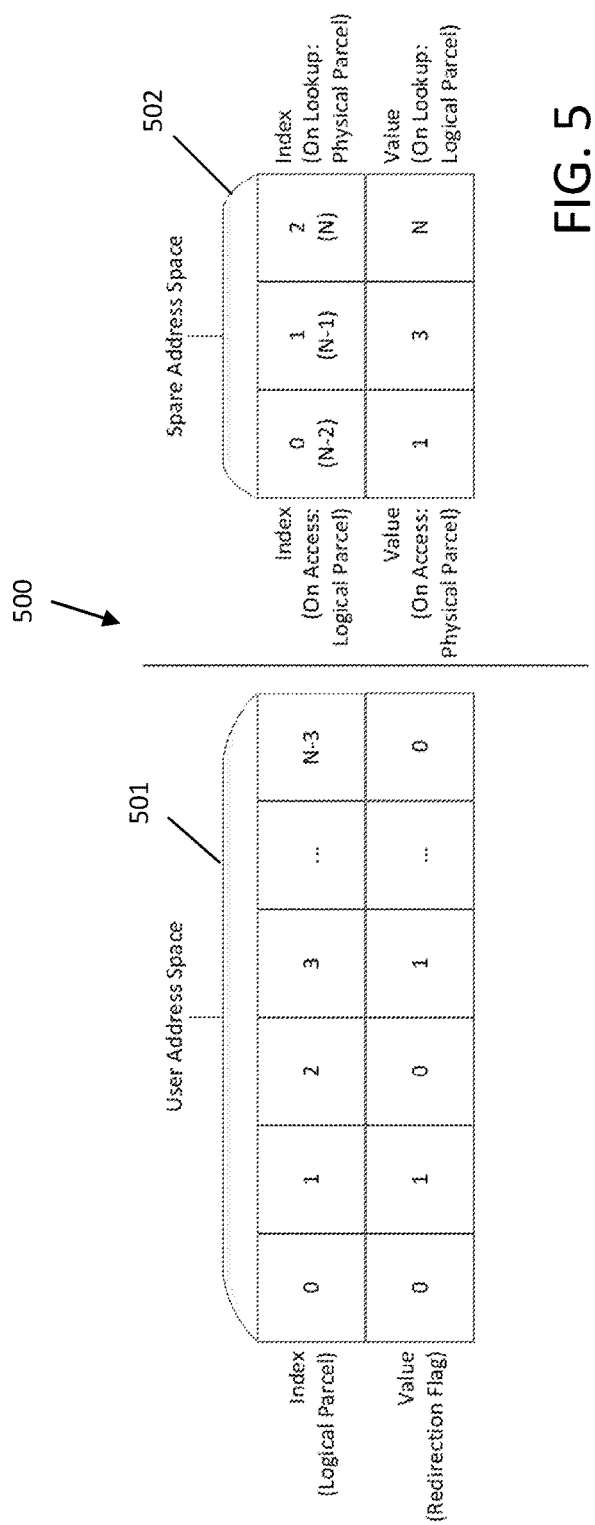
FIG. 5 illustrates an example bitmap-based repair table used for remapping of error-prone memory parcels in accordance with some embodiments of the present disclosure.

FIG. 5 illustrates an example bitmap-based repair table used for remapping of error-prone memory parcels in accordance with some embodiments of the present disclosure. In this implementation of a repair table, the user address space segment 501 of array 500 uses a bitmap, while the spare address space segment 502 is similar to the spare address space segment of the array 410 of FIG. 4B, which contains physical addresses or similar values. The array 500 has a logically addressed index, but, in contrast to the array 400/410 described above, the value for parcels in the user address space uses a bit as content of the index. For example, a zero indicates an identity-mapped user parcel, while a one indicates a redirected parcel. The memory subsystem 110 still utilizes redirected parcels in the spare address space, but the explicit association between remapped parcels now flows only one direction, i.e., from logical spare parcel to the physical parcel. Therefore, access to a redirected data parcels results in a search of the spare address space contents to find the corresponding source index, and thereby the corresponding data. Given the sparsity of redirections and the relatively small search area of spare address space, some embodiments can elect this implementation to trade off reduced repair table size in exchange for some additional complexity in locating redirected parcels. Several approaches can provide the needed lookup functionality, such as content-addressable memory (CAM), a simple linear search, a fixed association between the orders of set bits and the spare address space addresses, as well as other techniques.

In the example array 500, an attempt to access logical parcel 3, for example, would encounter a set bit in the bitmap. This triggers a lookup in the spare address space for the value "3", located at physical parcel N−1, and the access would target this physical address. In contrast, an attempt to access logical parcel 0 encounters a cleared bit in the bitmap and the access proceeds to access physical parcel 0, the implied identity mapping, with no lookup required.

In some embodiments, implementing a forward-reverse mapping procedure allows for a more effective management of the memory parcel remapping. When generating a newer mapping, a difference between the earlier mapping and the newer mapping is due to the difference in the error analysis (e.g., the two RBER lists are different). The constant remapping of user memory parcels to spare memory parcels over multiple generation of repair tables can result in reduction of spare memory parcels or considerable cross-mapping of user and spare memory parcels. Thus, in some embodiments, prior to the generation of the newer mapping, the processing device reverses the forward remapping of user parcels to spare parcels of the earlier repair table and then generates the remapping required for the newer repair table.

Figure 6:
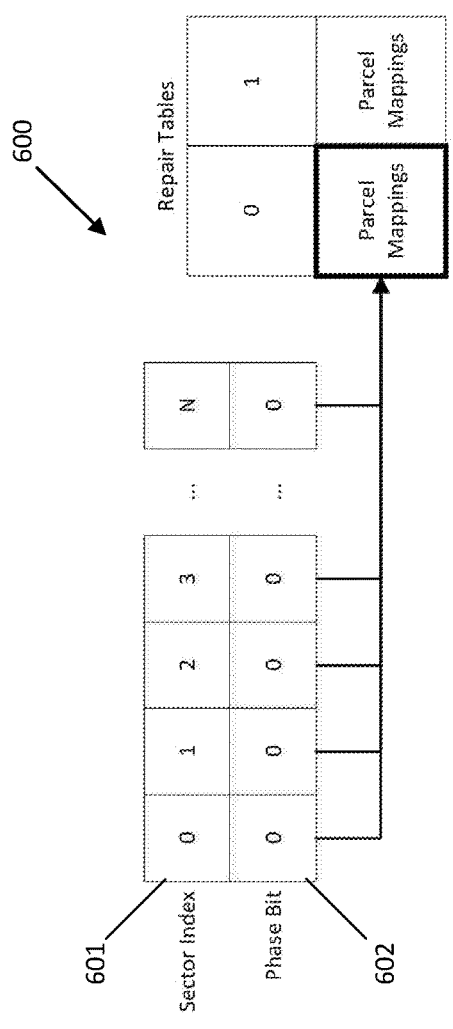
FIG. 6 illustrates use of phase bits to indicate which one of the two repair tables contains the correct mapping to locate sector content in accordance with some embodiments of the present disclosure.

FIG. 6 illustrates use of phase bits to indicate which one of the two repair tables contains the correct ("current") mapping to locate the sector content in accordance with some embodiments of the present disclosure. An operation of the scrubber 113 is to migrate user parcel content from its current physical storage location to another physical storage location for remapped memory parcels. For those memory parcels that retain the same physical location between the two repair tables 120-121, the scrubber operates to rewrite the data back to the original location. This ensures periodic reprogramming of the storage locations. In some embodiments, to prevent the storage location from becoming stale by storing the same content, the migration process inverts the reprogrammed content when writing to a storage location. The writing of content back to the same location is also referred to as a migration herein, since this operation also involve the accessing of the two repair tables.

For the memory parcels, the processing device needs some mechanism to keep track of the migration, in order to determine which repair table contains the correct location. For a memory parcel, the first repair table 120 contains the correct (e.g., "current") location for the content (e.g., data) for that memory parcel, until the processing device transfers the content to a new physical location (e.g., spare parcel) or writes the content back to the original location, as specified by the second repair table 121. Once the write occurs, the second repair table then operates to provide the current mapping for that memory parcel. The scrubber 113 can track and migrate each individual memory parcel separately, but this requires a substantial amount of housekeeping to track each memory cell. Instead, in some embodiments, the processing device transfers a sector of memory parcels at each transfer so that the migration tracking is at the sector level.

The scrubber 113 performs the migration of memory parcels for a sector and tracks the occurrence of the migration at the sector level. Furthermore, when the scrubber 113 performs the migration, the scrubber 113 can perform the error analysis on the memory parcels as well when reading the content, in order to generate the next list of RBER values for the memory parcels. The scrubber 113 can also perform the migration for spare parcels of the spare space as well, when the spare parcels are not within the sector, in order to reprogram the spare parcels and obtain RBER values for the spare parcels. It is possible that some or all of the spare parcels may qualify for use as a user parcel in the future, based on the RBER values.

To ensure use of the correct repair table for a transaction, the migration component 130 of scrubber 113 uses a bitmap having constituent phase bits associated with a sector. Thus, bitmap 600 shows each sector index entry 601 of a sector associated with a phase bit 602. The memory subsystem's read and write data paths can use either of two repair tables 120-121 based on the value of the sector's phase bit. The scrubber 113 utilizes a state of a phase bit for a respective sector to determine which of the first (older or earlier) repair table mapping or the second (newer) repair table mapping for that sector to use. For example, in some embodiments, when the phase bit for a sector is clear ("0"), scrubber 113 uses the parcel mappings of repair table 0 (e.g., first repair table 120), as shown in FIG. 6. When set ("1"), the scrubber 113 uses the parcel mappings of repair table 1 (e.g., second repair table 121). The scrubber uses the older repair table mapping prior to migration and the newer repair table mapping for the target of the migration, as well as accesses after the migration. In some embodiments, the local memory 119 stores the sector index 601 and respective phase bits 602 in bit map format. In other embodiments, the local memory can store the sector phase bit information in other formats, such as in metadata format.

Figure 7:
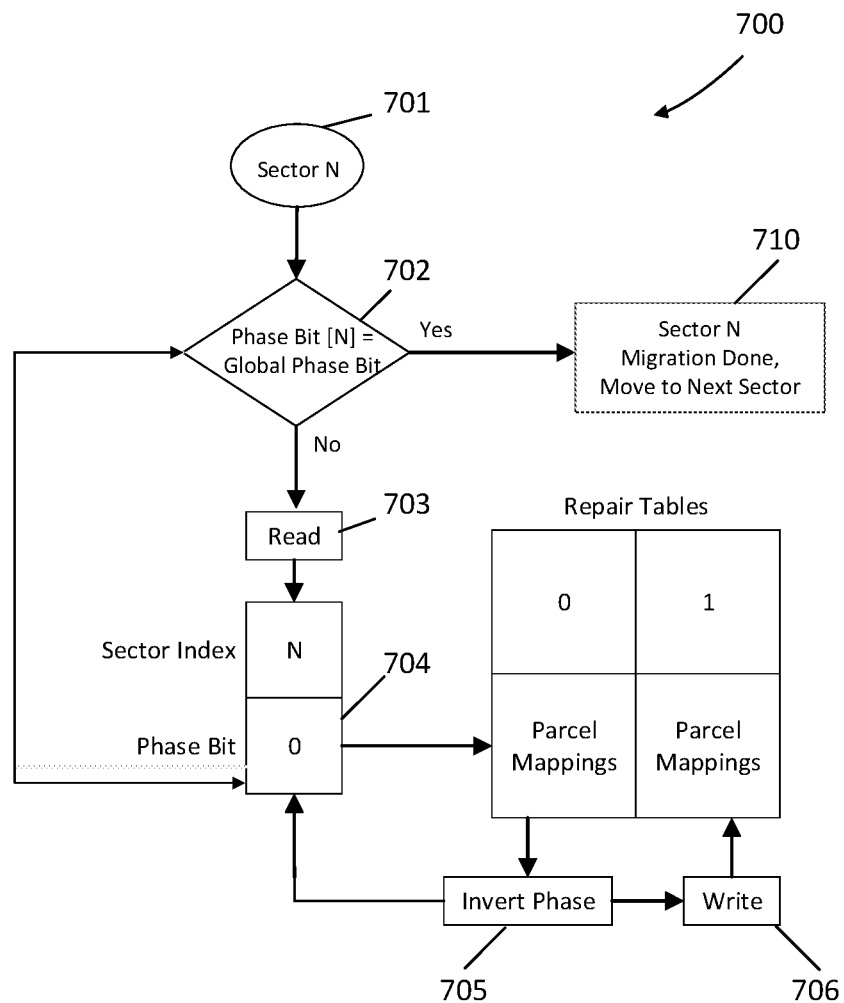
FIG. 7 illustrates an example migration of sector content from storage locations mapped in a first repair table to storage locations mapped in a second repair table in accordance with some embodiments of the present disclosure.

FIG. 7 illustrates an example migration 700 of sector content from storage locations mapped in a first repair table to storage locations mapped in a second repair table in accordance with some embodiments of the present disclosure. When the scrubber 113 is in migration mode to migrate data of memory parcels to remapped spare locations or reprogram the data back to the same location (herein, both regarded as migration), the scrubber sequences through each sector to migrate the sector contents. To migrate contents of memory parcels for Sector N (where N is an arbitrary number) commencing at block 701, the scrubber checks a status of a global phase bit at block 702. The global phase bit is an indicator to indicate which repair table is the newer repair table. That is, the global phase bit points to the repair table that has the newer mapping based on the newer error analysis.

Initially, the global phase bit and the sector phase bits all point to or indicate the first (older) repair table. Each sector phase bit denotes the repair table currently in use by the respective sector. With the generation of the second (newer) repair table, the state of the global phase bit changes to point to or indicate the newer repair table. This change of state (e.g., flipping to the other bit state) of the global phase bit commences the migration process or routine of the scrubber. As each sector migrates its content, that sector's phase bit changes its state (e.g., flips to the other bit state) to that of the global phase bit. When all sectors complete the migration, all of the sector phase bits will have the same state as the global phase bit. Because the first repair table is no longer needed, the first repair table is available to store the subsequent newer mapping, which can start the next migration sequence.

At block 702, the scrubber checks to determine if Sector N has already migrated. In some embodiments, the global phase bit matches the phase bit for sector N if already migrated. If already migrated, the scrubber moves to the next sector at block 710. If Sector N has not migrated its content based on the newer repair table, a read transaction 703 initiates a read operation for an index that corresponds to Sector N. The read transaction for Sector N may come from the scrubber 113 or from a client access. When the read access is a client access (e.g., access from a client, such as host 109), the processing device translates the address of the access to identify the sector. The current state of the phase bit 704 for Sector N indicates which repair table has the current in use mapping for Sector N. The scrubber 113 locates the sector mapping in the corresponding repair table and retrieves (e.g., "reads") the content from the physical storage location of memory component 112 for the memory parcels of Sector N. In the example of FIG. 7, the phase bit state is "0", so the scrubber 113 uses the mapping of repair table "0" to access the sector mapping of the memory parcels of Sector N and reads the contents of the memory parcels of Sector N from memory component(s) 112. In some embodiments, the processing device reads the Sector N content, based on repair table "0" and writes the Sector N content into a temporary buffer, which can be located in local memory 119. Subsequently, the processing device reads the content from the buffer and writes to the memory component (s) to complete the migration. In some embodiments, the processing device perform the read-buffer-write operations to complete the migration atomically.

In order to migrate, the scrubber 113 reads the content of Sector N, now in the buffer, invert the state or "phase" of the phase bit, at block 705, and writes, at block 706 the read content to the memory component 112 using the "other" repair table's mapping of the memory parcels for Sector N. In the example, the "other" repair table is repair table "1" which corresponds with the state of the global phase bit. The next access to the sector content for Sector N's uses the sector mapping of repair table 1. Note that in some embodiments, the memory subsystem 110 performs the operations shown in FIG. 7 atomically, so that the migration operation for a sector completes, before the processing device allows another access to Sector N. Also, in some embodiments, the write operation 706 may precede the invert phase operation 705.

In some embodiments, the scrubber 113 computes the metadata spare encodings using the "other" repair table (e.g., the target repair table) prior to writing to that repair table. Metadata spare encodings are metadata associated with the storage of the data and encoded for ECC recovery. The metadata spare encodings can also include an on-media representation of the updated phase bit (e.g., the inverted phase bit), which can assist with power-loss handling described further below. When the client access was a client read access, the processing device returns the requested sector content, but now having the location of the memory parcel determined by the Sector N mapping in the "other" repair table. Other metadata spare entities are possible.

When the scrubber 113 is not operating in the migration mode, a client access to content of a memory parcel is a normal access based on the current mapping of the sectors in one repair table. However, when the scrubber 113 is operating in the migration mode, the processing device needs to identify the repair table that holds the correct sector mapping for the memory parcels holding the content. Determining which table to use for the mapping depends on whether the migration has taken place, or not taken place, for the sector content. Accordingly, because the processing device needs to make this distinction when the scrubber is performing the migration operation, the processing device uses these client accesses to supplement the migration operation performed by the scrubber 113. Therefore, while the scrubber 113 is performing the migration, the processing device uses the client accesses to supplement the migration and performs a migration operation based on a client access, when that client access is to the sector content not yet migrated by the scrubber operation. The client access to assist the scrubber migration may be a write transaction to memory, a read transaction to memory or both read and write transactions to memory.

Figure 8:
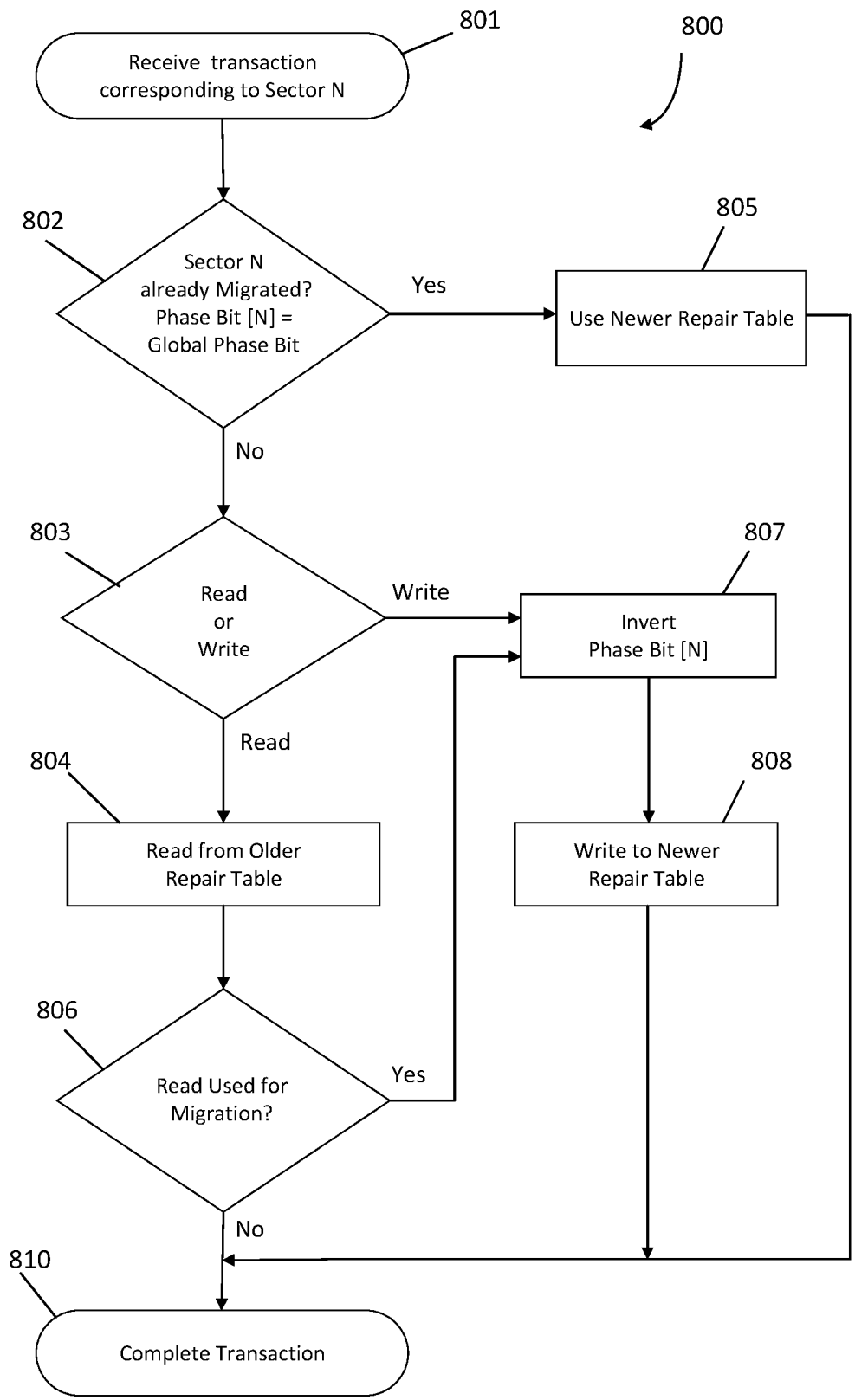
FIG. 8 is a flow diagram of an example method to perform a client-assisted media scrubbing in accordance with some embodiments of the present disclosure.

FIG. 8 is a flow diagram of an example method 800 to perform a client-assisted media scrubbing in accordance with some embodiments of the present disclosure. Processing logic that can include hardware (e.g., processing device, circuitry, dedicated logic, programmable logic, microcode, hardware of a device, integrated circuit, etc.), software (e.g., instructions run or executed on a processing device), or a combination thereof can perform the operations of the method 800. In some embodiments, a processing device, such as controller 115 operating with the scrubber 113 as described above, can perform the method 800. Although shown in a sequence or order, the method 800 can perform in a different order than shown. Furthermore, in some embodiments, the method can vary, omit, or modify one or more of the blocks.

Method 800 exemplifies a process for migrating content for memory parcels of a sector, based on parcel mappings present in the two repair tables earlier described. As described above, the processing device creates the two data structures (e.g., two repair tables), shown as repair tables 120 and 121. In some embodiments, the repair tables 120-121 reside in the local memory 119. In some embodiments, the repair tables, once completed, reside in the memory component 112, in case of power loss. In the example of method 800, a respective sector repair table of a set of sector repair tables in the first repair table 120 contains the mapping of parcels for the sector based on an earlier error analysis. The respective sector repair table of a set of sector repair tables in the second repair table 121 contains the mapping of parcels for the sector based on a subsequent or newer error analysis. Hence, first repair table 120 is the "older" or "earlier" repair table and the second repair table 121 is the "newer" repair table, in this example.

The processing device can perform the scrubber operation described above (e.g., in FIG. 7), to rewrite content to locations specified in the newer repair table to migrate the content. For phase change media, the migration operation also includes writing the content to spare locations or to the same physical location (e.g., reprogramming the content). The scrubber 113 performs the migration operation as part of the scrubber routine. The scrubber 113 can also perform the next round of error analysis to determine the RBER values for the memory parcels during the migration operation. As described above, the scrubber 113 provides functions to read content from storage locations for memory parcels of the sector based on sector mapping in one repair table and writes the content to other storage locations for the memory parcels of the sector, based on corresponding sector mapping in the second repair table. A global phase bit indicates which repair table contains the newer mapping and the target for the migration. A phase bit for a sector determines which repair table is currently in use by that sector. In some embodiments, a buffer in the local memory 119 can buffer the data for the parcels between the read and write operations. Although the scrubber 113 can perform the complete migration of the memory space in the background, the scrubber 113 may take substantial time to complete the data migration. During the process of the scrubber 113 migrating content, the processing device continues to receive read and write transactions from a client source, such as the host system 109.

The processing device can use these read and/or write transactions to assist or supplement in the ongoing migration of content by the scrubber routine. The method 800 depicts operation of the client-assisted phase-based media scrubbing. At block 801, the processing device, such as controller 115, receives a client transaction access to a sector (noted as example Sector N). For scrubber accesses, the scrubber 113 follows the process flow of FIG. 7 to sequence through the sectors. For a client read access, the processing device can use this read operation as an opportunity to read the sector content based on the mapping in the first repair table 120 and write the content into the buffer. The processing device writes this content to the corresponding target locations of the memory parcels for the sector mapped in the second repair table 121 to complete the migration. The processing device also sends the read content to the client in response to the client read transaction.

A write transaction from a client can also achieve the migration. When the client access is a write access, the processing device translates the address of the write transaction to one of the sectors. Because the write operation would over-write the old content, there is no need to read the sector content for a client write transaction. The processing device handles the client write access by loading the content associated with the client write to the buffer, accessing the sector mapping in the second repair table 121, and writing the buffer content to the storage locations of the memory parcels for the sector mapped in the second repair table 121.

At decision block 802, comparing a system-wide phase bit, noted as the global phase bit, to the sector phase bit indicates whether a commit operation, such as the migration operation, is ongoing. Other embodiments can use other indicators instead of the global phase bit. The value of the global phase bit matches the phase bit value for all sectors during a non-migration operation. The processing device inverts the global phase bit when a migration operation commences, where the bit state of the global phase bit indicates the repair table containing the newer mapping of the memory parcels of that sector.

If, at block 802, the sector's phase bit does correspond to the global phase bit, indicating that the migration has already occurred for this sector, the client transaction uses the newer repair table, at block 805, to complete the transaction, at block 810. If, at block 802, the sector's phase bit does not correspond (e.g., does not match) to the global phase bit, indicating that the processing device has not yet performed the migration of Sector N to the newer repair table indicated by the state of the global phase bit, the processing device, at block 803, determines if the transaction is a read or a write.

If the transaction, at block 803, is a read transaction, the processing device atomically first reads the content for Sector N from the memory parcels mapped in the older repair table, at block 804. In some embodiments, the processing device uses an error correction operation (e.g., ECC component 131) to correct the read content. With the client read transaction, the processing device has an option to utilize or not utilize the client read transaction to assist in performing the migration of read content. If utilized to assist in the migration, at block 806, the processing device changes the state of the sector's phase bit (e.g., invert or toggle the phase bit), at block 807, and writes the sector content to the memory parcels mapped in the newer repair table specified by the state of the global phase bit, at block 808 (which is the same bit state as the inverted sector phase bit of block 807). The processing device, at block 810, completes the transaction for Sector N, at block 810, which can include the processing device providing a response to the client (e.g., returning data in response to the read operation). The processing device can perform the operations of blocks 807-808 in any order or simultaneously. If the processing device does not use the client read transaction to assist in the migration, at block 806, the processing device sends the content to the client to complete the transaction, at block 810. The scrubber can later migrate the contents of this sector.

If the transaction, at block 803, is a write transaction, the processing device changes the state of the sector's phase bit (e.g., invert or toggle the phase bit), at block 807, and writes the transaction content to the memory parcels mapped in the newer repair table specified by the state of the global phase bit, at block 808 (which is the same bit state as the inverted sector phase bit of block 807).

The toggling of the sector's phase bit inverts the state of the phase bit, making the sector's phase bit correspond to the current global phase bit. Because the sector's phase bit corresponds (e.g., matches) to the global phase bit, subsequent client reads and writes will not trigger a new migration operation, until the global phase bit flips to the other state. Also, subsequent read and write transactions to this sector uses the newer repair table as the current repair table, which holds the correct mapping for identifying the now migrated sector.

Hence, once a scrubber operation commences a migration operation, intervening client operations (reads and/or writes) can assist the ongoing migration operation. When the migration operation commences, the processing device toggles the global phase bit. As the scrubber performs the migration of each sector, the scrubber changes the respective phase bit state to match the global phase bit. During the ongoing migration process, a client access, whether a read or a write transaction, to a sector not already migrated as indicated by the phase bits, causes the processing device to write data (either read data of the read transaction or data corresponding to the write transaction) to a physical storage location for the sector based on the newer repair table. When the scrubber migration process reaches any of the sectors already processed by the client read and write operations, the state of the phase bit for that sector indicates that the migration to the new repair table has already taken place. When the scrubber completes its run through the memory component(s) 112, all sector phase bits match the global phase bit again, signaling completion of the ongoing migration operation for the scrubber. At this point, the newer (second) repair table becomes the current (now first) repair table. The original (first or older) repair table carries stale information, so the processing device, can utilize this repair table for the subsequent "newer" repair table.

The processing device can perform the error analysis and generate the next RBER mapping of memory parcels in this subsequent "newer" repair table. Once generated, there will again be two usable repair tables 120 and 121, so that the scrubber can run the next migration process. The current state of the global phase bit indicates the new current repair table. Until the next commencement of the migration process, the repair table matching the global phase bit operates as the current repair table. The two repair tables (e.g., repair tables 120 and 121) toggle back and forth as the older and newer repair tables after each migration run of the scrubber.

Furthermore, in some embodiments, the processing device associates a reliable flag called a codeword phase bit with a sector. This reliable flag can reside outside the ECC codeword(s) in a bitwise replication encoded manner (for reliability) or it can be a single bit encoded in an ECC protected codeword metadata. Whenever the processing device writes the codeword, the processing device encodes the reliable flag reflective of the sector phase bit. An agent (e.g., ECC component 131) performing the corrected read operation can use the reliable flag for determining the correct sector phase bit.

The processing device can store the global phase bit, all sector phase bits, the two repair tables, as well as the reliable flag (when used) in local memory 119. The processing device can also store the two repair tables in non-volatile memory (e.g., memory component 112) when created. The processing device can also store a scrubber pointer in the local memory that indicates the location of the current sector operated on by the scrubber. The local memory can include storage for buffering of data for the client.

In some instances, the memory subsystem 110 may lose power and volatile state information during a commit operation of a client access or the scrubber transaction. Upon subsequent power on, either migrated or non-migrated sectors will have the correct repair table, but not both. This presumes that both repair tables are in non-volatile memory, such as memory component 112. Although a variety of approaches are available, below are two independent methods for recovering the sectors' phase bits.

In a first approach for recovering the sectors' phase bits upon power-loss detection, the memory subsystem 110 can rapidly persist (store) several pieces of information to non-volatile storage (e.g., memory component 112). The information includes (1) the value of the global phase bit, (2) the identifying address of the last-migrated sector by the scrubber (e.g., scrubber migration cursor or pointer), and (3) the sectors' phase bit values for every sector above the migration cursor (assuming the address space scan is low to high). The information could also include the two repair tables 120-121, if not already stored in the non-volatile memory. Upon subsequent power restoration, the processing device (e.g., controller 115) restores the repair tables, by use of implementation-specific metadata that indicates which is operating as the "older" and which is operating as "newer" at the time of power loss. The processing device matches the phase bit for any sector with an address less than or equal to the value of the migration cursor to that of the persisted global phase bit, indicating they have been migrated. All sectors above the cursor receive their pre-power loss phase bit settings restored. Thus, the memory subsystem 110 can restore the full state prior to power loss and the migration can continue at the cursor position. A benefit of this approach is that power interruption does not degrade performance and the migration sequence commences exactly where it left off.

Figure 9:
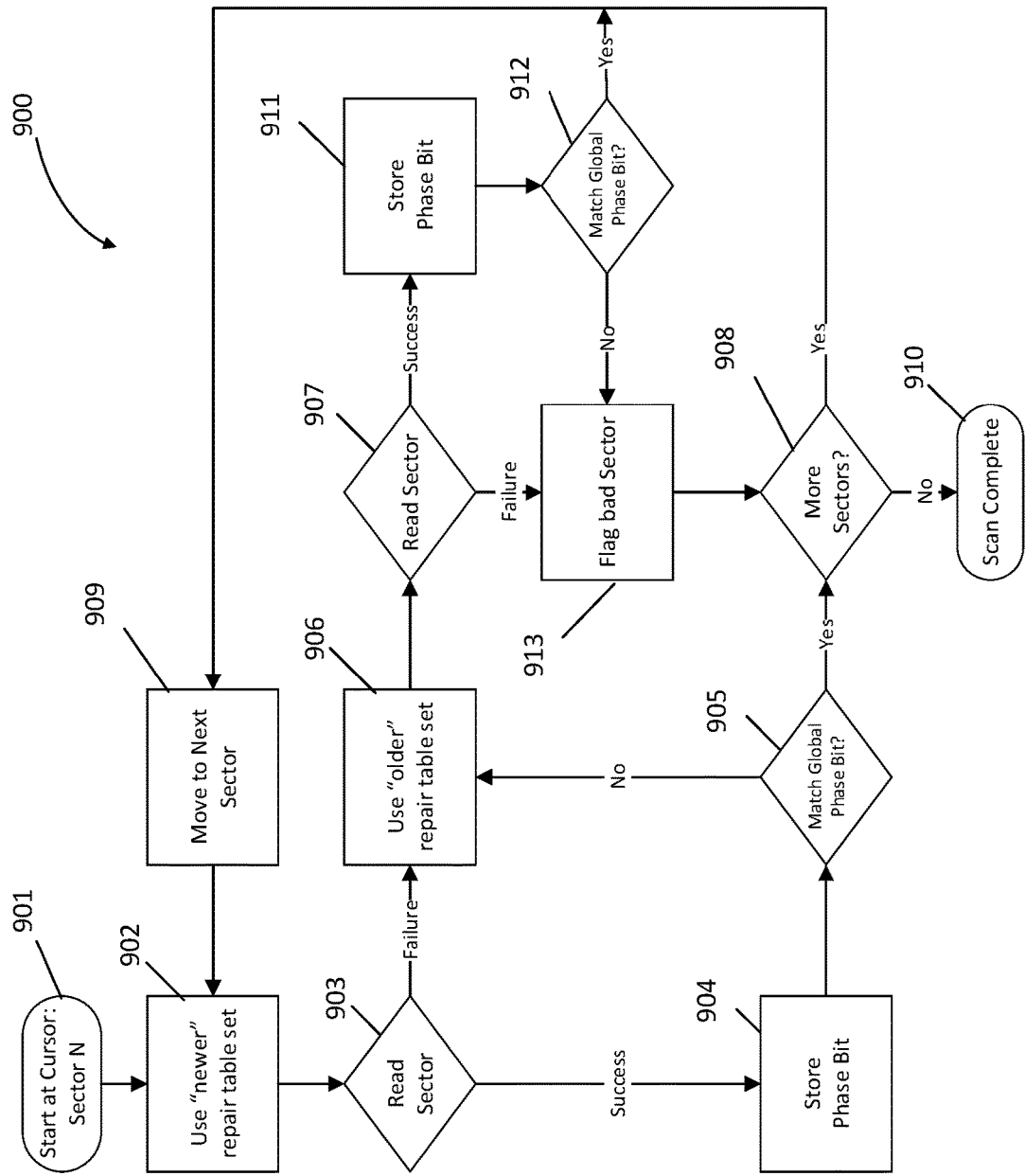
FIG. 9 is a flow diagram of an example method to perform power-on scanning procedure to recover sector phase states in accordance with some embodiments of the present disclosure.

FIG. 9 is a flow diagram of an example method 900 to perform power-on scanning procedure to recover sector phase states in accordance with some embodiments of the present disclosure. Processing logic that can include hardware (e.g., processing device, circuitry, dedicated logic, programmable logic, microcode, hardware of a device, integrated circuit, etc.), software (e.g., instructions run or executed on a processing device), or a combination thereof can perform the operations of the method 900. In some embodiments, a processing device, such as controller 115 operating with the scrubber 113, can perform the method 900. Although shown in a sequence or order, the method 900 can perform in a different order than shown. Furthermore, in some embodiments, the method can vary, omit, or modify one or more of the blocks.

FIG. 9 shows a second approach for recovering the sectors' phase bits. Like the first approach, the sequential sector scanning approach includes power loss persistence of several pieces of information to non-volatile storage. The information includes the repair tables (if not already stored in the non-volatile memory), the value of the global phase bit and the identifying address of the last-migrated sector by the scrubber (e.g., the migration cursor). Unlike the first approach, this second approach does not require persistence of a complete or partial sectors' phase bit map. Therefore, upon power restoration, the memory subsystem 110 needs to recreate the sector phase bits to determine which the already migrated sectors and the non-migrated sectors, in order to determine which repair table to use for each sector (e.g., determine the phase bit for each sector at the time of power loss).

Upon power restoration, the system restores the "older" and "newer" repair tables (as indicated by implementation-specific metadata) and sets all sectors' phase bits to the persisted global phase bit value (which effectively means the system assumes all sectors have been migrated, as the global phase bit points to the newest repair table). The "older" and "newer" repair tables correspond to the two repair tables 120-121, depending on which is operating as the "older" and which is operating as "newer" at the time of power loss. The processing device, then performs a read scan of each of the sectors in the same sequential order as used by the migration operation, starting at the migration cursor. During this scan, the scrubber reads each sector.

The power-on read scan implemented by the scrubber is like the standard migration sequence. The scrubber starts at the sector (shown as Sector N) referenced by the persisted cursor, at block 901, uses the newer repair table at block 902, and iterates through the address space (e.g., sector index), performing a read against each sector, at block 903. Note that sectors above the migration cursor have already migrated prior to the interruption caused by the power loss. For the read operation for Sector N, if an associated error correction codeword corrects the content properly (noted as "Success" at block 903), the scrubber interrogates the codeword metadata that contains the phase bit setting and stores the phase bit, at block 904, for Sector N. If the codeword phase bit of block 904 does not match the global phase bit, at block 905, the scrubber assumes that the sector did not yet migrate and assumes that the "older" repair table is the correct repair table, at block 906. If the codeword phase bit of block 904 matches the global phase bit at block 905, this match confirms that the migration has already happened for this sector. The stored phase bit value at block 904 is the correct phase bit value and the newer repair table is the correct repair table. If there are more sectors (block 908), the scrubber moves the migration cursor to the next sector, at block 909, to repeat the process, commencing at block 902, using the newer repair table. If there are no more sectors (at block 908), the scan is complete and the power-on read scan finishes at block 910.

If the codeword does not correct at block 903, the scrubber assumes that the migration has not happened, and the newer repair table is the incorrect repair table. The scrubber inverts the repair table phase bit value, effectively pointing it to the older repair table and uses the older repair table, at block 906, and re-attempts the read operation, at block 907, but this time using the older repair table. The read operation using the older repair table at block 906 is also applicable for the mis-matched phase bit, at block 905. Assuming the uncorrectable codeword was due to an incorrect repair table selection (e.g., initially selecting the newer repair table instead of the older repair table), the read operation reads the sector content based on the older repair table, at block 907. This read operation should produce a correctable codeword, with the correct phase bit value for the sector. If successful, the scrubber stores this phase bit value, at block 911, and checks if it matches the global phase bit, at block 912. If the Sector N phase bit matches the global phase bit at block 912, the match signifies that the older repair table selection is correct (e.g., that the migration has not happened yet for Sector N and the older repair table is the correct repair table to use) and moves to block 909. If there is still a failure at block 907 or at block 912, the failure condition signifies that this sector could be corrupt and flags Sector N a bad sector, at block 913. When the scrubber finishes the power-on scan for sectors past the migration cursor, the memory subsystem should have recovered the sector phase bit mapping that was present prior to the power loss and identify any sector(s) as potential unrecoverable sector(s).

Client read transactions to access the memory component 112 during this power-on scan process follow the method 900 as shown in FIG. 9 for sectors past the present location of the migration cursor. The read flow interrogates the codeword phase bit of a read sector data and performs the operations described starting at block 902 to determine if Sector N has migrated yet or not.

Client write transactions to access the memory component 112 during this power-on scan process simply write using the newer repair table. If the sector were unmigrated, this step would migrate it and the scrubber need not perform any additional work when it encounters this sector.

Figure 10:
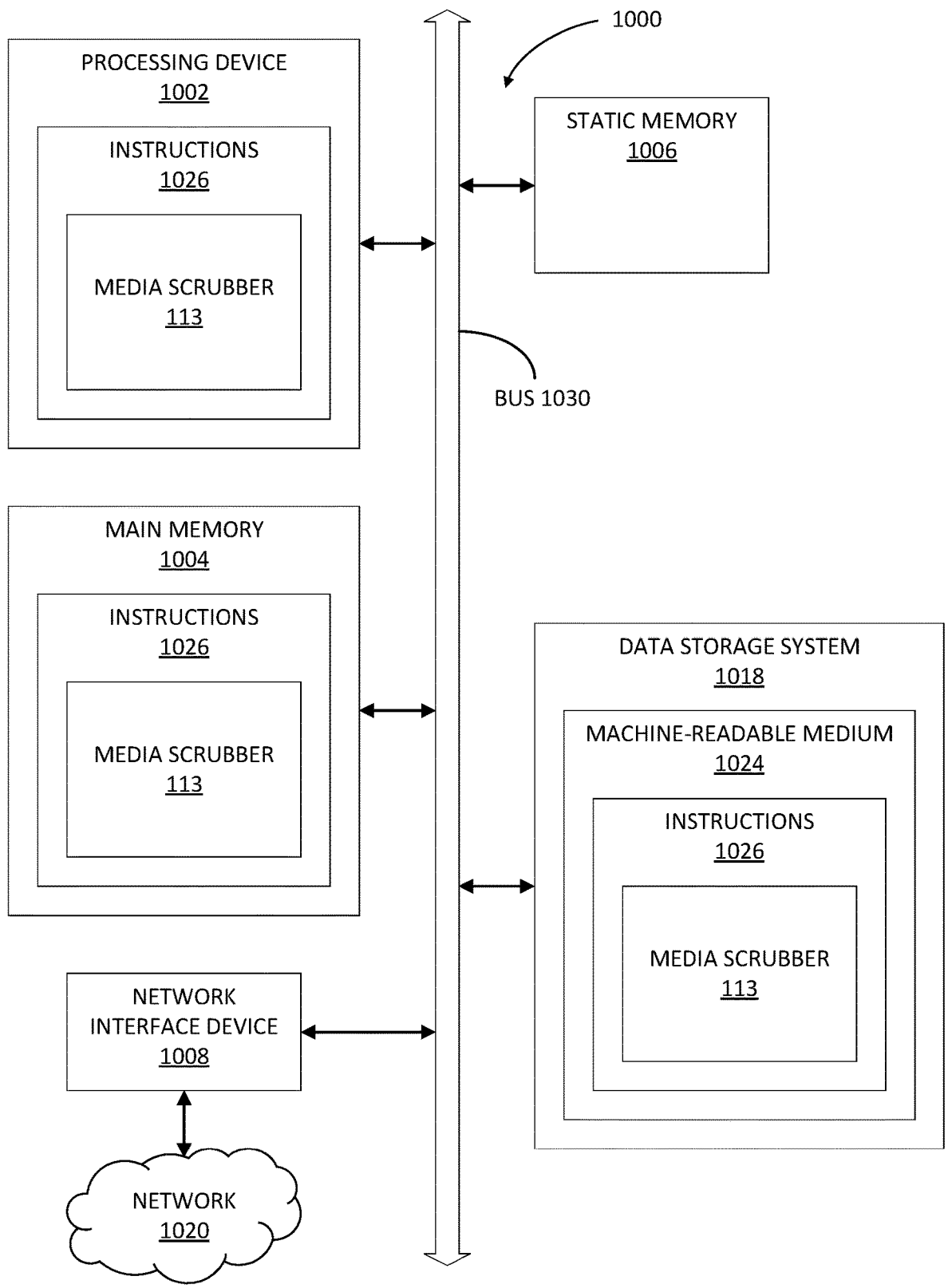
FIG. 10 is a block diagram of an example computer system environment that can operate in accordance with some embodiments of the present disclosure.

FIG. 10 is a block diagram of an example computer system environment that can operate in accordance with some embodiments of the present disclosure. FIG. 10 illustrates an example machine of a computer system 1000 that can execute a set of instructions for causing the machine to perform any one or more of the methodologies discussed herein. In some embodiments, the computer system 1000 can correspond to a host system (e.g., the host system 109 of FIG. 1) that includes, coupled to, or utilizes a memory subsystem (e.g., the memory subsystem 110 of FIG. 1) or can be used to perform the operations of a controller (e.g., to execute an operating system to perform operations corresponding to the controller 115, having scrubber component 113 of FIG. 1). In alternative embodiments, the machine can connect (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions by that machine. Further, the term "machine" can also include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random-access memory (DRAM) such as synchronous DRAM (SDRAM) or Rambus DRAM (RDRAM), etc.), a static memory 1006 (e.g., flash memory, static random-access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 executes instructions 1026 for performing the operations and methods discussed herein. The computer system 1000 can further include a network interface device 1008 to communicate over the network 1020.

The data storage system 1018 can include a machine-readable storage medium 1024 (also known as a computer-readable medium) which stores one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory subsystem 110 of FIG. 1.

In one embodiment, the instructions 1026 include instructions to implement functionality corresponding to a controller 115 having media scrubber component 113 of FIG. 1). While the machine-readable storage medium 1024 is a single medium, the term "machine-readable storage medium" can include a single medium that stores or multiple media that store the one or more sets of instructions. The term "machine-readable storage medium" includes any medium capable of storing or encoding a set of instructions for execution by the machine and that cause the machine to perform any one or more of the methodologies of the present disclosure. The term "machine-readable storage medium" accordingly can include, but not limited to, solid-state memories, optical media, and magnetic media.

In a scrubber-only migration sequence the scrubber does the migration exclusively. Therefore, client transactions can read and write to unmigrated media, which can have higher RBER until the scrubber migrates the error-prone storage locations. Higher RBER media can require higher tiers of error correction to recover the data, resulting in longer latency transactions and lower QoS across the memory subsystem. Therefore, many read and write cycles over an extended period (e g, many hours) can access and utilize unmigrated media before the scrubber eventually performs the migration. Media health statistics collected against these transactions may result in negative impact or falsely illustrate poor media health.

A scrubber-only approach adds incrementally more write cycles to media than a client-assisted migration as the scrubber can rewrite sectors to re-encode storage locations of parcels against the newest mapped repair table representation. A client transaction migrates storage locations for a sector, allowing the scrubber to skip migrating that sector, provided the client transaction occurs prior to the scrubber pointer arriving to migrate that sector.

A client-assisted migration can generally finish more quickly than a scrubber-only migration, allowing the scrubber to transition to the RBER sampling phase more quickly, which can result in a more comprehensive assessment of RBER over time.

Some portions of the preceding detailed descriptions describe algorithms and symbolic representations of operations on data bits within a computer or memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals. It has proven convenient at times, principally for reasons of common usage, to refer to these signals as bits, values, elements, symbols, characters, terms, numbers, or the like.

However, these and similar terms are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can include specially constructed device for the intended purposes, or it can include a general-purpose computer selectively activated or reconfigured by a computer program stored in the computer. For example, a computer system or other data processing system, such as the controller 115, can carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic and/or optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems or more specialized apparatus, with programs in accordance with the teachings herein, can perform the described method. A computer program product or software, which can include a machine-readable medium having stored thereon instructions, can perform a process according to the present disclosure.

What is claimed is:

1. A method comprising:
receiving a write transaction directed to a group of memory parcels of a memory device, the write transaction received from a client source external to the memory device;
determining a state of a first indicator, which is a global indicator for the memory device, used to indicate which of a first data structure or a second data structure contains a newer mapping of the group of memory parcels, wherein one of the first and second data structures contains an older mapping of the group of memory parcels to first storage locations based on an earlier error analysis of the memory parcels, and wherein other of the first and second data structures contains the newer mapping of the group of memory parcels to second storage locations based on a newer error analysis of the memory parcels;

determining a state of a second indicator used to indicate which of the first data structure or the second data structure is in current use for the group of memory parcels;

comparing the states of the first and second indicators and when comparison of the states of the first and second indicators determines that a data structure in current use for the group of memory parcels does not contain the newer mapping of the group of memory parcels, changing the state of the second indicator to the state of the first indicator;

locating the group of memory parcels in the first data structure or the second data structure indicated by the state of the first indicator; and in response to receiving the write transaction from the client source, writing content of the write transaction to storage locations for the group of memory parcels based on the newer mapping of the group of memory parcels.

2. The method of claim 1, further comprising a plurality of groups of memory parcels, in which each group of memory parcels has a corresponding second indicator to respectively indicate which one of the first and second data structures is in current use.

3. The method of claim 2, further comprising:
using a bit as a global phase bit for the first indicator and using a bit of a plurality of bits as a phase bit for the second indicator of each group of the plurality of groups of memory parcels.

4. The method of claim 3 further comprising:
when all of the phase bits correspond to the global phase bit, signifying that all of the plurality of groups of memory parcels are using the data structure containing the newer mapping, generating a subsequent newer mapping of the plurality of groups of memory parcels based on a subsequent newer error analysis of the plurality of groups of memory parcels;

replacing the older mapping in one of the first and second data structures with the subsequent newer mapping of the plurality of groups of memory parcels; and changing the state of the global phase bit to indicate one of the first and second data structures now containing the subsequent newer mapping of the plurality of groups of memory parcels.

5. The method of claim 1, further comprising:
allocating a first portion of memory parcels of the memory device for use as user memory parcels of the group of memory parcels and a second portion of memory parcels of the memory device for use as spare memory parcels;

generating the first data structure by:
performing the earlier error analysis on the first and second portions of the memory parcels to identify a first number of memory parcels having highest error rates;

for the first number of memory parcels having the highest error rates, determining which of the first number of memory parcels are the user memory parcels and which are the spare memory parcels; and remapping user memory parcels having the highest error rates to spare memory parcels not identified as having the highest error rates to remove storage locations having the highest error rates from a user space of the memory device and to substitute in place storage locations of spare memory parcels not having the highest error rates; and generating the second data structure after generating the first data structure by:
performing the newer error analysis on the first and second portions of the memory parcels to identify a second number of memory parcels having the highest error rates;

for the second number of memory parcels having the highest error rates, determining which of the second number of memory parcels are the user memory parcels and which are the spare memory parcels; and remapping user memory parcels having the highest error rates to the spare memory parcels not identified in the newer error analysis as having the highest error rates to remove storage locations having the highest error rates from the user space of the memory device and to substitute in place storage locations of spare memory parcels not having the highest error rates from the newer error analysis.

6. The method of claim 5, wherein the generating the first data structure and the second data structure further comprising:
mapping a user memory parcel to itself when not remapped to one of the spare memory parcels and when remapped to one of the spare memory parcels, identifying a particular spare memory parcel for remapping.

7. The method of claim 6, wherein the generating the first data structure and the second data structure further comprising:
utilizing a bit map associated with each memory parcel of the group of memory parcels, wherein a first bit state of a bit in the bit map indicates redirecting of a user memory parcel to a spare memory parcel and a second bit state indicates no redirecting.

8. The method of claim 1, further comprising:
receiving a read transaction directed to a second group of memory parcels of the memory device, the read transaction received from the client source external to the memory device;

determining a state of a third indicator used to indicate which of the first data structure or the second data structure is in current use for the second group of memory parcels;

comparing the states of the first and third indicators, wherein the first indicator also indicates which of the first data structure or the second data structure contains a newer mapping of the second group of memory parcels to storage locations of the memory device, based on earlier error analysis and newer error analysis of the second group of memory parcels;

when comparison of the states of the first and third indicators determines that a data structure in current use does not contain the newer mapping of the second group of memory parcels:
reading content from storage locations for the second group of memory parcels by utilizing mapping from one of the first data structure and the second data structure indicated as in current use by the third indicator;

changing the state of the third indicator to the state of the first indicator; and writing the read content to storage locations for the second group of memory parcels indicated by the state of the first indicator; and when comparison of the states of the first and third indicators determines that a data structure in current use does contain the newer mapping of the second group of memory parcels, reading content from storage locations for the second group of memory parcels by utilizing mapping from one of the first data structure and the second data structure indicated as in current use by the third indicator.

9. The method of claim 8 further comprising:
inverting content of one or more memory parcels during the write transaction or during a read transaction when writing the read content.

10. The method of claim 8 further comprising:
performing a migration operation for a portion of a plurality of groups of memory parcels by utilizing read and write transactions from the client source external to the memory device; and
using a scrubber routine to migrate content of remaining groups of the plurality of the groups of memory parcels that were not migrated by the read and write transactions from the client source external to the memory device.

11. A non-transitory computer-readable storage medium comprising instructions that, when executed by a processing device, cause the processing device to perform operations comprising:
receiving a write transaction directed to a group of memory parcels of a memory device, the write transaction received from a client source external to the memory device;
determining a state of a first indicator, which is a global indicator for the memory device, used to indicate which of a first data structure or a second data structure contains a newer mapping of the group of memory parcels, wherein one of the first and second data structures contains an older mapping of the group of memory parcels to first storage locations based on an earlier error analysis of the memory parcels, and wherein other of the first and second data structures contains the newer mapping of the group of memory parcels to second storage locations based on a newer error analysis of the memory parcels;
determining a state of a second indicator used to indicate which of the first data structure or the second data structure is in current use for the group of memory parcels;
comparing the states of the first and second indicators and when comparison of the states of the first and second indicators determines that a data structure in current use for the group of memory parcels does not contain the newer mapping of the group of memory parcels, changing the state of the second indicator to the state of the first indicator;
locating the group of memory parcels in the first data structure or the second data structure indicated by the state of the first indicator; and
in response to receiving the write transaction from the client source, writing content of the write transaction to storage locations for the group of memory parcels based on the newer mapping of the group of memory parcels.

12. The non-transitory computer-readable storage medium of claim 11, wherein the instructions further cause the processing device to perform operations comprising:
receiving a read transaction directed to a second group of memory parcels of the memory device, the read transaction received from the client source external to the memory device;
determining a state of a third indicator used to indicate which of the first data structure or the second data structure is in current use for the second group of memory parcels;
comparing the states of the first and third indicators, wherein the first indicator also indicates which of the first data structure or the second data structure contains a newer mapping of the second group of memory parcels to storage locations of the memory device, based on earlier error analysis and newer error analysis of the second group of memory parcels;
when comparison of the states of the first and third indicators determines that a data structure in current use does not contain the newer mapping of the second group of memory parcels:
reading content from storage locations for the second group of memory parcels by utilizing mapping from one of the first data structure and the second data structure indicated as in current use by the third indicator;
changing the state of the third indicator to the state of the first indicator; and
writing the read content to storage locations for the second group of memory parcels indicated by the state of the first indicator; and
when comparison of the states of the first and third indicators determines that a data structure in current use does contain the newer mapping of the second group of memory parcels, reading content from storage locations for the second group of memory parcels by utilizing mapping from one of the first data structure and the second data structure indicated as in current use by the third indicator.

13. A system comprising:
a non-volatile memory component; and
a processing device coupled to the non-volatile memory component and configured to:
receive a write transaction directed to a group of memory parcels of a memory device, the write transaction received from a client source external to the memory device;
determine a state of a first indicator, which is a global indicator for the memory device, used to indicate which of a first data structure or a second data structure contains a newer mapping of the group of memory parcels,
wherein one of the first and second data structures contains an older mapping of the group of memory parcels to first storage locations based on an earlier error analysis of the memory parcels, and wherein other of the first and second data structures contains the newer mapping of the group of memory parcels to second storage locations based on a newer error analysis of the memory parcels;
determine a state of a second indicator used to indicate which of the first data structure or the second data structure is in current use for the group of memory parcels;
compare the states of the first and second indicators and when comparison of the states of the first and second indicators determines that a data structure in current use for the group of memory parcels does not contain the newer mapping of the group of memory parcels, change the state of the second indicator to the state of the first indicator;

locate the group of memory parcels in the first data structure or the second data structure indicated by the state of the first indicator; and in response to receiving the write transaction from the client source, write content of the write transaction to storage locations for the group of memory parcels based on the newer mapping of the group of memory parcels.

14. The system of claim 13, wherein the processing device is further configured to perform on a plurality of groups of memory parcels, in which each group of memory parcels has a corresponding second indicator to respectively indicate which one of the first and second data structures is in current use.

15. The system of claim 14, wherein the processing device is further configured to use a bit as a global phase bit for the first indicator and use a bit of a plurality of bits as a phase bit for the second indicator of each group of the plurality of groups of memory parcels.

16. The system of claim 15, wherein the processing device is further configured to:
when all of the phase bits correspond to the global phase bit, signifying that all of the plurality of groups of memory parcels are using the data structure containing the newer mapping, generate a subsequent newer mapping of the plurality of groups of memory parcels based on a subsequent newer error analysis of the plurality of groups of memory parcels;
replace the older mapping in one of the first and second data structures with the subsequent newer mapping of the plurality of groups of memory parcels; and
change the state of the global phase bit to indicate one of the first and second data structures now containing the subsequent newer mapping of the plurality of groups of memory parcels.

17. The system of claim 13, wherein the processing device is further configured to:
receive a read transaction directed to a second group of memory parcels of the memory device, the read transaction received from the client source external to the memory device;
determine a state of a third indicator used to indicate which of the first data structure or the second data structure is in current use for the second group of memory parcels;
compare the states of the first and third indicators, wherein the first indicator also indicates which of the first data structure or the second data structure contains a newer mapping of the second group of memory parcels to storage locations of the memory device, based on earlier error analysis and newer error analysis of the second group of memory parcels;
when comparison of the states of the first and third indicators determines that a data structure in current use does not contain the newer mapping of the second group of memory parcels:
read content from storage locations for the second group of memory parcels by utilizing mapping from one of the first data structure and the second data structure indicated as in current use by the third indicator;
change the state of the third indicator to the state of the first indicator; and
write the read content to storage locations for the second group of memory parcels indicated by the state of the first indicator; and
when comparison of the states of the first and third indicators determines that a data structure in current use does contain the newer mapping of the second group of memory parcels, read content from storage locations for the second group of memory parcels by utilizing mapping from one of the first data structure and the second data structure indicated as in current use by the third indicator.

18. The system of claim 17, wherein the processing device is further configured to:
perform a migration operation for a portion of a plurality of groups of memory parcels by utilizing read and write transactions from the client source external to the memory device; and
use a scrubber routine to migrate content of remaining groups of the plurality of the groups of memory parcels that were not migrated by the read and write transactions from the client source external to the memory device.

19. The system of claim 13, wherein the processing device further comprising a local memory to store the first data structure, the second data structure, and the first indicator.

20. The system of claim 13, wherein the processing device is further configured to:
allocate a first portion of memory parcels of the memory device for use as user memory parcels of the group of memory parcels and a second portion of memory parcels of the memory device for use as spare memory parcels;
generate the first data structure by:
perform the earlier error analysis on the first and second portions of the memory parcels to identify a first number of memory parcels having highest error rates;
for the first number of memory parcels having the highest error rates, determine which of the first number of memory parcels are the user memory parcels and which are the spare memory parcels; and
remap user memory parcels having the highest error rates to spare memory parcels not identified as having the highest error rates to remove storage locations having the highest error rates from a user space of the memory device and to substitute in place storage locations of spare memory parcels not having the highest error rates; and
generate the second data structure after generating the first data structure by:
perform the newer error analysis on the first and second portions of the memory parcels to identify a second number of memory parcels having the highest error rates;
for the second number of memory parcels having the highest error rates, determine which of the second number of memory parcels are the user memory parcels and which are the spare memory parcels; and
remap user memory parcels having the highest error rates to the spare memory parcels not identified in the newer error analysis as having the highest error rates to remove storage locations having the highest error rates from the user space of the memory device and to substitute in place storage locations of spare memory parcels not having the highest error rates from the newer error analysis.

\* \* \* \* \*